United States Patent
Yamazaki

(10) Patent No.: US 7,707,385 B2
(45) Date of Patent: Apr. 27, 2010

(54) METHODS AND APPARATUS FOR ADDRESS TRANSLATION FROM AN EXTERNAL DEVICE TO A MEMORY OF A PROCESSOR

(75) Inventor: Takeshi Yamazaki, Kanagawa (JP)

(73) Assignee: Sony Computer Entertainment Inc., Tokyo (JP)

(*) Notice: Subject to any disclaimer, the term of this patent is extended or adjusted under 35 U.S.C. 154(b) by 223 days.

(21) Appl. No.: 11/011,784

(22) Filed: Dec. 14, 2004

(65) Prior Publication Data

US 2006/0129786 A1 Jun. 15, 2006

(51) Int. Cl.
G06F 12/00 (2006.01)

(52) U.S. Cl. .................. 711/220; 711/206; 711/212; 711/219

(58) Field of Classification Search .............. 711/220, 711/206

See application file for complete search history.

(56) References Cited

U.S. PATENT DOCUMENTS

| | | | | |
|---|---|---|---|---|
| 3,902,163 A | * | 8/1975 | Amdahl et al. | 711/207 |
| 4,356,549 A | * | 10/1982 | Chueh | 711/216 |
| 4,385,352 A | * | 5/1983 | Bienvenu | 711/208 |
| 5,428,759 A | | 6/1995 | Smith et al. | |
| 5,475,827 A | * | 12/1995 | Lee et al. | 711/207 |
| 5,497,469 A | * | 3/1996 | Sakata et al. | 711/203 |
| 5,584,005 A | * | 12/1996 | Miyaoku et al. | 711/206 |
| 5,644,755 A | * | 7/1997 | Wooten | 703/23 |
| 5,652,872 A | | 7/1997 | Richter et al. | |
| 5,706,461 A | * | 1/1998 | Branstad et al. | 711/203 |
| 5,752,275 A | * | 5/1998 | Hammond | 711/207 |
| 6,088,780 A | * | 7/2000 | Yamada et al. | 711/206 |
| 6,349,380 B1 | * | 2/2002 | Shahidzadeh et al. | 712/211 |
| 6,526,491 B2 | | 2/2003 | Suzuoki et al. | |
| 6,738,889 B2 | * | 5/2004 | Godtland et al. | 711/209 |
| 2003/0126398 A1 | * | 7/2003 | Shinozaki | 711/206 |

FOREIGN PATENT DOCUMENTS

EP 0 078 229 A1 5/1983

(Continued)

OTHER PUBLICATIONS

Edward F. Gehringer. 'CSC/ECE 501 Lecture Notes', 1997, pp. 194-204 http://people.engr.ncsu.edu/efg/501/f97/lectures/lec17.ps.*

(Continued)

*Primary Examiner*—Brian R Peugh
*Assistant Examiner*—Kalpit Parikh
(74) *Attorney, Agent, or Firm*—Matthew B. Dernier, Esq.; Gibson & Dernier LLP

(57) ABSTRACT

Methods and apparatus provide for adding a base address to an external address to produce first intermediate address; using only a first portion of the first intermediate address as a pointer to select one of a plurality of entries in a segment table, each entry of the segment table representing a different segment of a memory using at least a portion of the selected entry of the segment table as a reference to one or more of a plurality of entries in a page table, each entry in the page table including at least a portion of a physical address in the memory and belonging to a group of entries representing a page in the selected segment of the memory; using the second portion of the first intermediate address to produce a second intermediate address; and using at least a portion of the second intermediate address as a pointer directly to one of the referenced entries in the page table to obtain an at least partially translated physical address into the memory for the external address.

24 Claims, 10 Drawing Sheets

FOREIGN PATENT DOCUMENTS

| | | |
|---|---|---|
| EP | 0 291 558 A1 | 11/1988 |
| EP | 0 464 333 A2 | 1/1992 |
| GB | 1 498 116 | 1/1978 |
| GB | 1 514 555 | 6/1978 |
| JP | 64017138 | 1/1989 |
| JP | 2000148665 | 5/2000 |

OTHER PUBLICATIONS

Marvin Solomon. 'CS 537 Lecture Notes, Part 8 Segmentation', Dec. 2001. http://web.archive.org/web/20011220141240/http://www.cs.wisc.edu/~solomon/cs537/segmentation.html.*

Baruch, Zoltan Francisc, "Structure of Computer Systems," 2002, pp. 216-222.*

ISR and Written Opinion, Apr. 10, 2006.

Chinese Office Action for corresponding application CN 200580043012.1 dated Jul. 11, 2008.

Korean Office Action for corresponding application KR 10-2007-7015663 dated Jun. 26, 2008.

Chinese Office Action for corresponding application JP 2005360940 dated Jul. 15, 2008.

Japanese Office Action for Corresponding Japanese Patent Application No. 360940, Oct. 7, 2008.

* cited by examiner

METHODS AND APPARATUS FOR ADDRESS TRANSLATION FROM AN EXTERNAL DEVICE TO A MEMORY OF A PROCESSOR

BACKGROUND

The present invention relates to methods and apparatus for translating address from an external memory space to the memory space of a processor.

In recent years, there has been an insatiable desire for faster computer processing data throughputs because cutting-edge computer applications involve real-time, multimedia functionality. Graphics applications are among those that place the highest demands on a processing system because they require such vast numbers of data accesses, data computations, and data manipulations in relatively short periods of time to achieve desirable visual results. These applications require extremely fast processing speeds, such as many thousands of megabits of data per second. While some processing systems employ a single processor to achieve fast processing speeds, others are implemented utilizing multi-processor architectures. In multi-processor systems, a plurality of sub-processors can operate in parallel (or at least in concert) to achieve desired processing results.

A suitable processing system for executing such applications may include one or more processors and a memory. In some processing systems, it may be desirable to transfer data from an external system (such as another processing system, a CCD or the like) into the memory of the processing system. As the memory space visible to the external system may be translated with respect to the memory space of the processing system, it may be necessary to translate the memory addresses of the external system associated with the transfer of data into the memory of the processing system.

SUMMARY OF THE INVENTION

One or more embodiments of the present invention may provide for an improved technique for translating addresses of an external system for use in a processing system such that data from the external system may be stored in a memory of the processing system.

In accordance with one or more embodiments, a processing system includes a processor, a memory, and an address translator (preferably implemented in hardware). The memory is divisible into a number of segments, each segment being divisible into a plurality of pages. The page size in each segment may be specified, but it preferably uniform. A program running on the processor initializes a segment table and a page table. The most significant bits (MSBs) of each entry in the segment table define the page size and the least significant bits (LSBs) of each entry in the segment table define a base position in the page table. Each base position in the page table is the starting entry in a plurality of entries corresponding to a page of addresses in the shared memory. Each entry within the page table represents the MSBs of the physical addresses in the shared memory.

A contiguous region of the external address space may be mapped to a segment of the memory by registering the region via a system call to the processor. For each external address, a base value may be added to obtain a first intermediate address. The MSBs of the first intermediate address are used as a pointer to an entry in the segment table. The remaining bits of the first intermediate address are used as a second intermediate address. The MSBs of the entry in the segment table (i.e., the page size) define a number of LSBs of the second intermediate address to be used for a page offset in the physical address. The remaining bits of the entry of the segment table are used as a pointer to a starting entry in the page table. The remaining bits of the second intermediate address (i.e., the MSBs thereof) are used as a pointer to an entry in the page table via offset from the starting entry in the page table. The contents of the entry of the page table are used as the MSBs of the physical address, while the LSBs of the second intermediate address augment the entry via use as the LSBs of the physical address.

In accordance with one or more further embodiments, a method includes: adding a base address to an external address to produce first intermediate address; using a first portion of the first intermediate address as a pointer to select one of a plurality of entries in a segment table, each entry of the segment table representing a different segment of a memory; using at least a portion of the selected entry of the segment table as a reference to one or more of a plurality of entries in a page table, each entry in the page table including at least a portion of a physical address in the memory and belonging to a group of entries representing a page in the selected segment of the memory; and using some or all of a second portion of the first intermediate address as a pointer to one of the referenced entries in the page table to obtain an at least partially translated physical address into the memory for the external address.

The step of using a first portion of the first intermediate address includes using the most significant bits thereof as the pointer into the segment table.

The method may also include: using the second portion of the first intermediate address to produce a second intermediate address; and using at least a portion of the second intermediate address as the pointer to one of the referenced entries in the page table. A number of bits (preferably the MSBs) of the selected entry of the segment table may be used to divide the bits of the second intermediate address. The number of bits of the selected entry of the segment table are preferably used to identify a number of least significant bits of the second intermediate address.

The most significant bits of the second intermediate address are preferably used as the pointer to select one of the referenced entries in the page table. The portion of the physical address within the selected entry in the page table is used to produce a portion of the translated physical address for the external address. The least significant bits of the second intermediate address are used to augment the portion of the physical address within the selected entry in the page table to produce the translated physical address for the external address.

The portion of the selected entry of the segment table points to a top entry of a group of entries representing a page in the selected segment of the memory. The most significant bits of the second intermediate address are preferably used as an offset from the top entry of the group to select the one of the referenced entries in the page table.

In accordance with one or more further embodiments, an apparatus includes: an adding circuit operable to add a base address to an external address to produce first intermediate address; and a look-up circuit. The look-up circuit is preferably operable to: (i) use a first portion of the first intermediate address as a pointer to select one of a plurality of entries in a segment table, each entry of the segment table representing a different segment of a memory, and (ii) use at least a portion of the selected entry of the segment table as a reference to one or more of a plurality of entries in a page table, each entry in the page table including at least a portion of a physical address in the memory and belonging to a group of entries representing a page in the selected segment of the memory, and (iii) use some or all of a second portion of the first intermediate address as a pointer to one of the referenced entries in the page table to obtain an at least partially translated physical address into the memory for the external address.

In accordance with one or more further embodiments, an apparatus includes: means for adding a base address to an external address to produce first intermediate address; means for using a first portion of the first intermediate address as a pointer to select one of a plurality of entries in a segment table, each entry of the segment table representing a different segment of a memory; means for using at least a portion of the selected entry of the segment table as a reference to one or more of a plurality of entries in a page table, each entry in the page table including at least a portion of a physical address in the memory and belonging to a group of entries representing a page in the selected segment of the memory; and means for using some or all of a second portion of the first intermediate address as a pointer to one of the referenced entries in the page table to obtain an at least partially translated physical address into the memory for the external address.

In accordance with one or more further embodiments, an apparatus includes: at least one processor capable of being coupled to a memory; and an address translation circuit operable to translate a virtual address received from an external device into a physical address into the memory. The at least one processor is operable to produce a segment table and a page table usable by the address translation circuit, the segment table including a plurality of entries, each representing a different segment of the memory, and the page table including a plurality of entries, each having at least a portion of a physical address in the memory and belonging to a group of entries representing a page in one of the segments of the memory.

The address translation circuit is preferably operable to: add a base address to the virtual address to produce first intermediate address; use the most significant bits of the first intermediate address as a pointer to select one of a plurality of entries in the segment table; and use at least a portion of the selected entry of the segment table as a pointer to a top entry of a group of entries representing a page in the selected segment of the memory. The address translation circuit is preferably further operable to at least one of: (i) use the least significant bits of the first intermediate address to produce a second intermediate address; (ii) use the most significant bits of the second intermediate address as an offset from the top entry of the group to select one of the referenced entries in the page table; (iii) use the portion of the physical address within the selected entry in the page table to produce a portion of the physical address; and (iv) use the least significant bits of the second intermediate address to augment the portion of the physical address within the selected entry in the page table to produce the physical address.

In accordance with one or more further embodiments, a storage medium contains a program that is capable of causing a processing system to perform actions, comprising: adding a base address to an external address to produce first intermediate address; using a first portion of the first intermediate address as a pointer to select one of a plurality of entries in a segment table, each entry of the segment table representing a different segment of a memory; using at least the least significant bits of the selected entry of the segment table as a pointer to a selected entry in a page table, each entry in the page table including at least a portion of a physical address in the memory and belonging to a group of entries representing a page in the selected segment of the memory, and the selected entry being of a group of entries representing a page in the selected segment of the memory; and using some or all of a second portion of the first intermediate address as a pointer to one of the referenced entries in the page table to obtain an at least partially translated physical address into the memory for the external address.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PRESENT INVENTION

Figure 1:
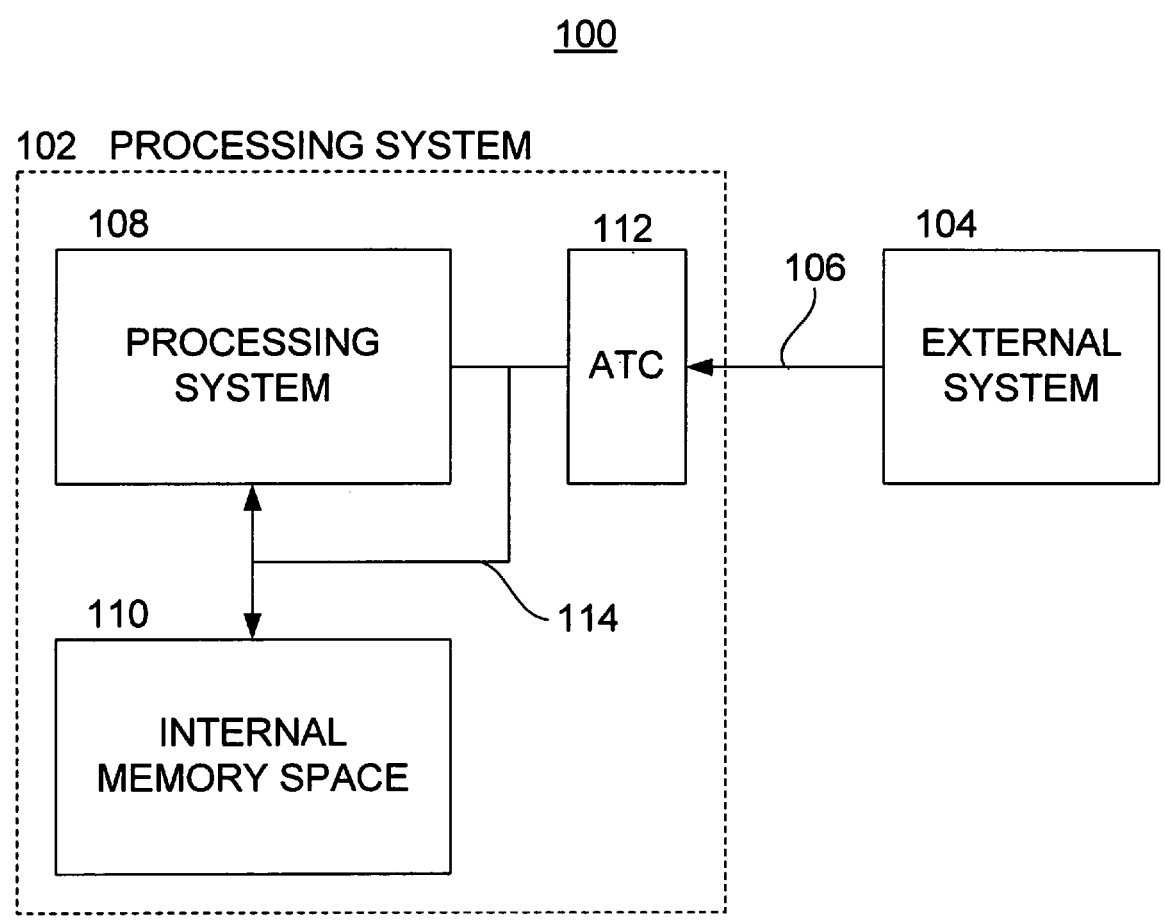
FIG. 1 is a block diagram illustrating the structure of a processing system that may be adapted in accordance with one or more aspects of the present invention.

With reference to the drawings, wherein like numerals indicate like elements, there is shown in FIG. 1 a processing system 100 that may be adapted for carrying out one or more features of the present invention. For the purposes of brevity and clarity, the block diagram of FIG. 1 will be referred to and described herein as illustrating an apparatus 100, it being understood, however, that the description may readily be applied to various aspects of a method with equal force.

The system 100 includes a processing system 102 and an external system 104 coupled to one another over a bus 106. The processing system 102 may include one ore more processors 108, a memory 110, and an address translator circuit 112 coupled to one another over a bus 114. It is understood that the system 100 might also include other devices, but are omitted for the purposes of brevity and clarity.

The processor 108 may be implemented utilizing any of the known technologies that are capable of requesting data from the memory 110, and manipulating the data to achieve a desirable result. For example, the processor 108 may be implemented using any of the known microprocessors that are capable of executing software and/or firmware, including standard microprocessors, distributed microprocessors, etc. By way of example, the processor 108 may be a graphics processor that is capable of requesting and manipulating data, such as pixel data, including gray scale information, color information, texture data, polygonal information, video frame information, etc.

In some processing contexts the external system 104 may seek to read or write data from/to the memory 110. In this regard, the address translator circuit 112 is preferably operable to translate a virtual address (external address of a differing memory space) received from the external system 104 into a physical address of the memory 110. Indeed, the external system 104 may not operate in the same memory space as the memory 110 and, therefore, address translation is carried out by the address translator circuit 112.

Figure 2:
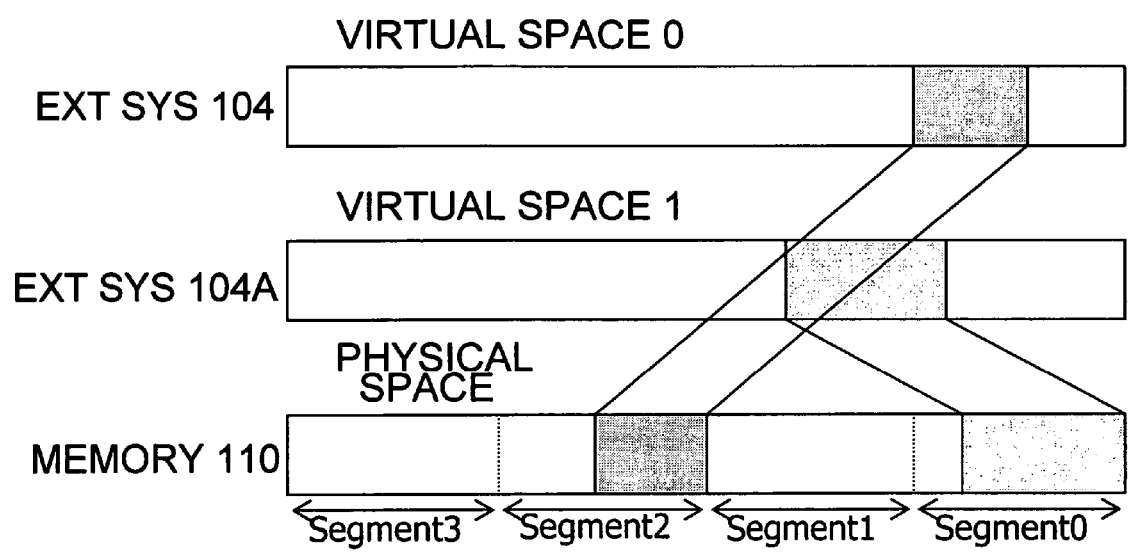
FIG. 2 is a conceptual diagram illustrating address translation that may be carried out by the system of FIG. 1.

With reference to FIG. 2, the memory 110 is preferably divisible into a number of segments, e.g., segment 0, segment 1, segment 2, etc. Each segment is preferably divisible into a plurality of pages. While the memory 110 enjoys its own physical space, the external system 104 operates in a virtual space, e.g., virtual space 0, which is not a one-for-one identical space as the physical space of the memory 110. The address translator circuit 112 is operable to convert addresses 120 of the virtual space 0 to physical address 122 of the memory 110. As there may be one or more external systems, the address translator circuit 112 may be operable to translate addresses 124 of other virtual spaces, e.g., virtual space 1 into physical addresses 126 of the memory 110.

Figure 3:
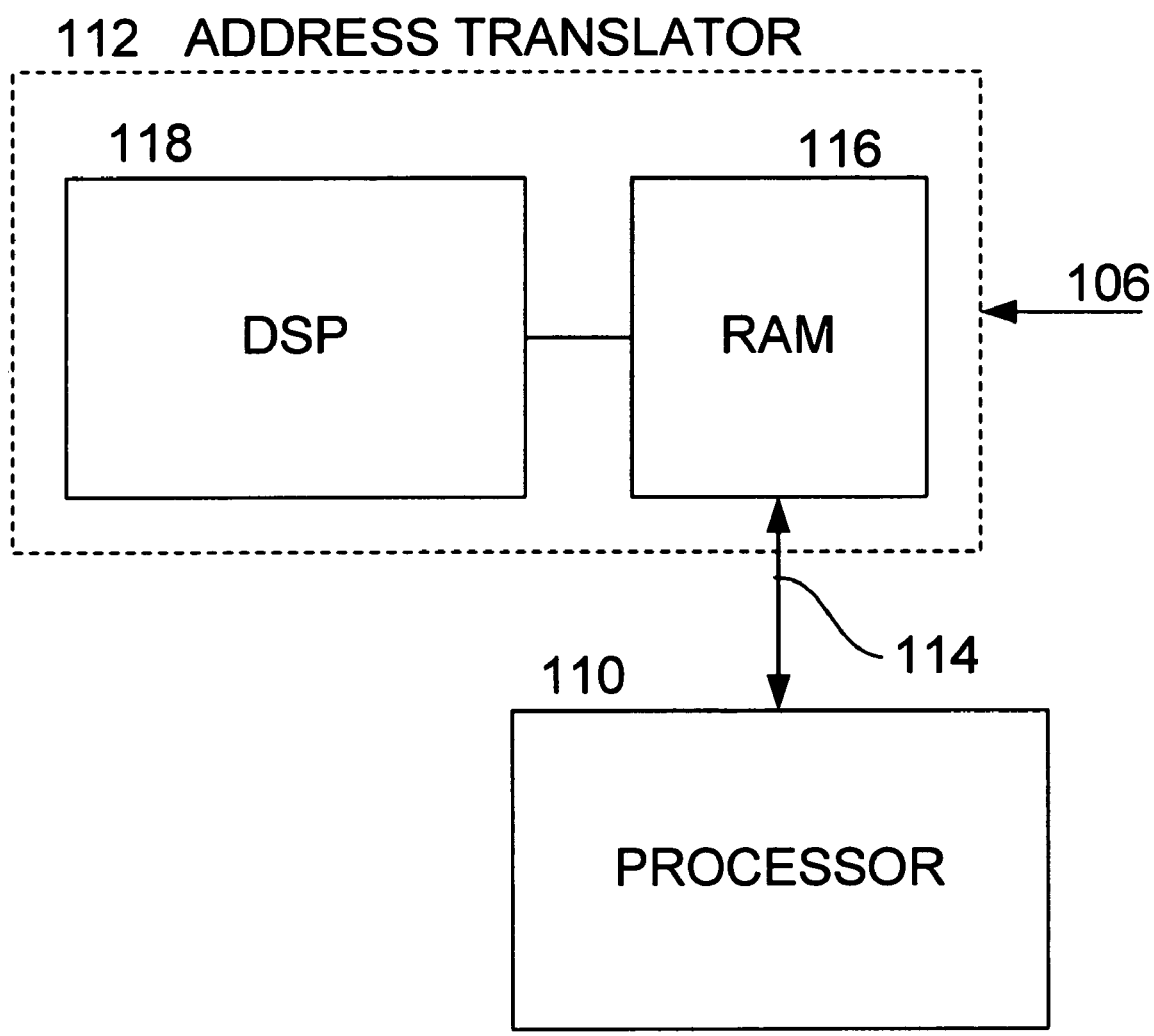
FIG. 3 is a block diagram illustrating a suitable structure for implementing one or more of the functions of the processing system of FIG. 1 in accordance with one or more aspects of the present invention.

Reference is now made to FIG. 3, which is a block diagram illustrating an example of how the address translator circuit 112 may be implemented. In this embodiment, the address translator circuit 112 may include a memory, such as a random access memory (RAM) 116 coupled to a digital signal processor (DSP) 118. The DSP 118 is operable to carry out actions in accordance with a program stored in the RAM 116, where the program causes the DSP to carry out the address translation function. The processor 108 is also preferably coupled to the address translator circuit 112, particularly the RAM 116, in order to assist in achieving address translation.

The processor 108 is preferably operable to initialize certain data for use by the program executing on the DSP 118. The data preferably include a segment table 206 and a page table 208 (best seen in FIG. 4). The segment table 206 preferably includes a plurality of entries, each representing a different segment of the memory 110. The page table 208 preferably includes a plurality of entries 208B, each having at least a portion of a physical address in the memory 110. Each of the entries 208B of the page table 208 belong to a group of entries 208A representing a page in one of the segments of the memory 110.

Figure 4:
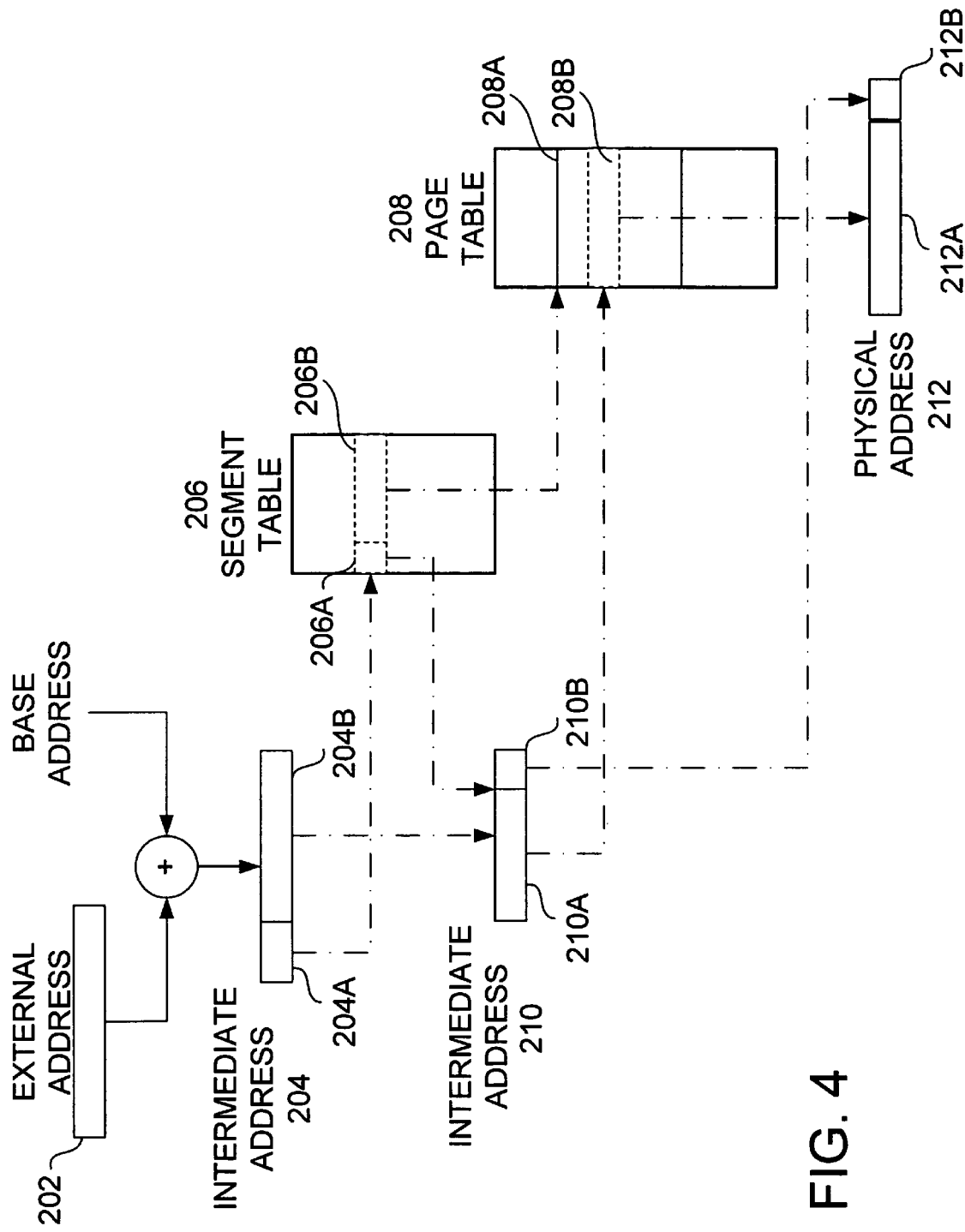
FIG. 4 is a partial block diagram and a partial flow diagram illustrating actions that may be carried out by the processing system of FIG. 1 in accordance with one or more aspects of the present invention.
Figure 5:
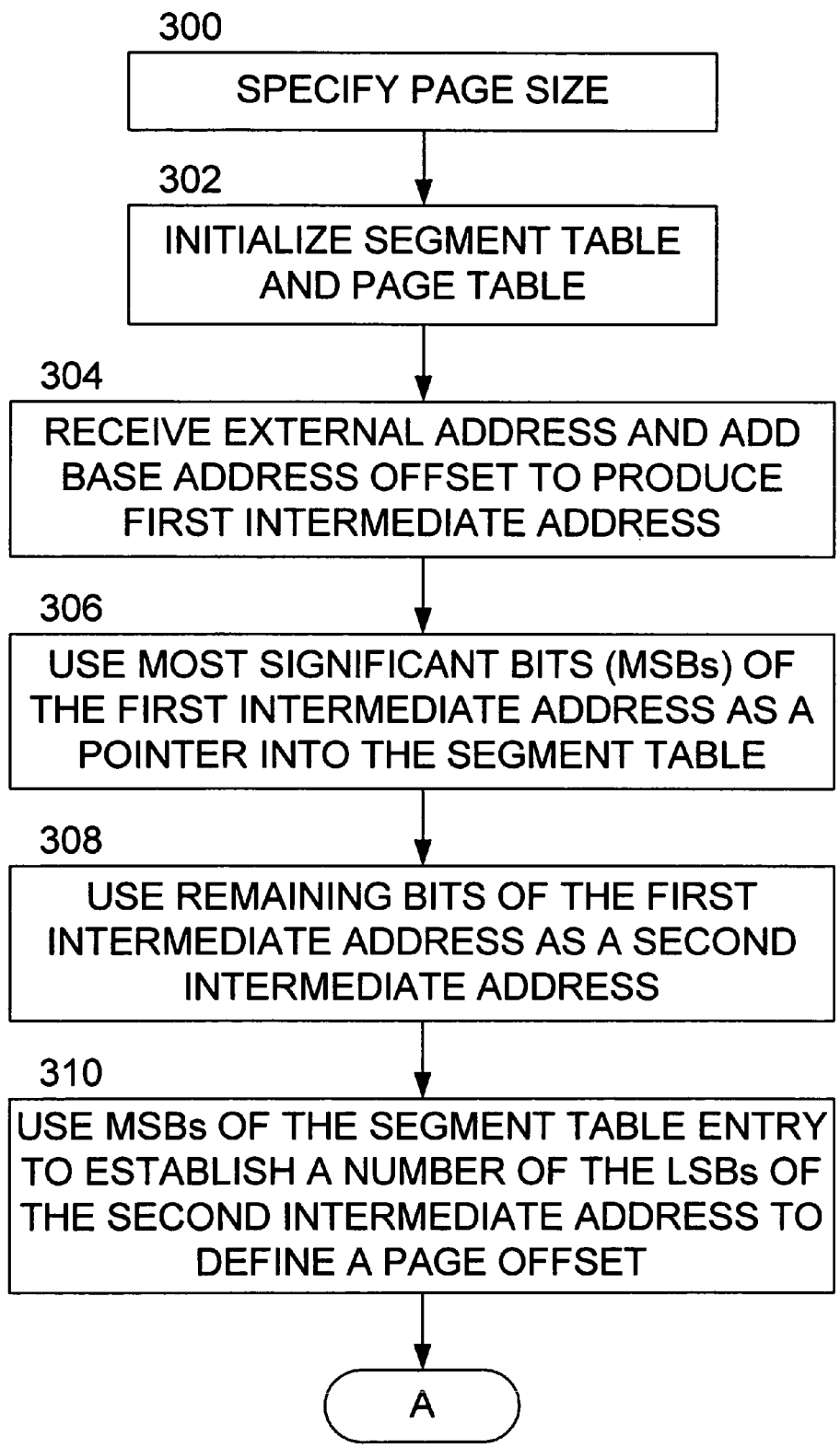
FIG. 5 is a flow diagram illustrating process steps that may be carried out by the processing system of FIG. 1 in accordance with one or more aspects of the present invention.
Figure 6:
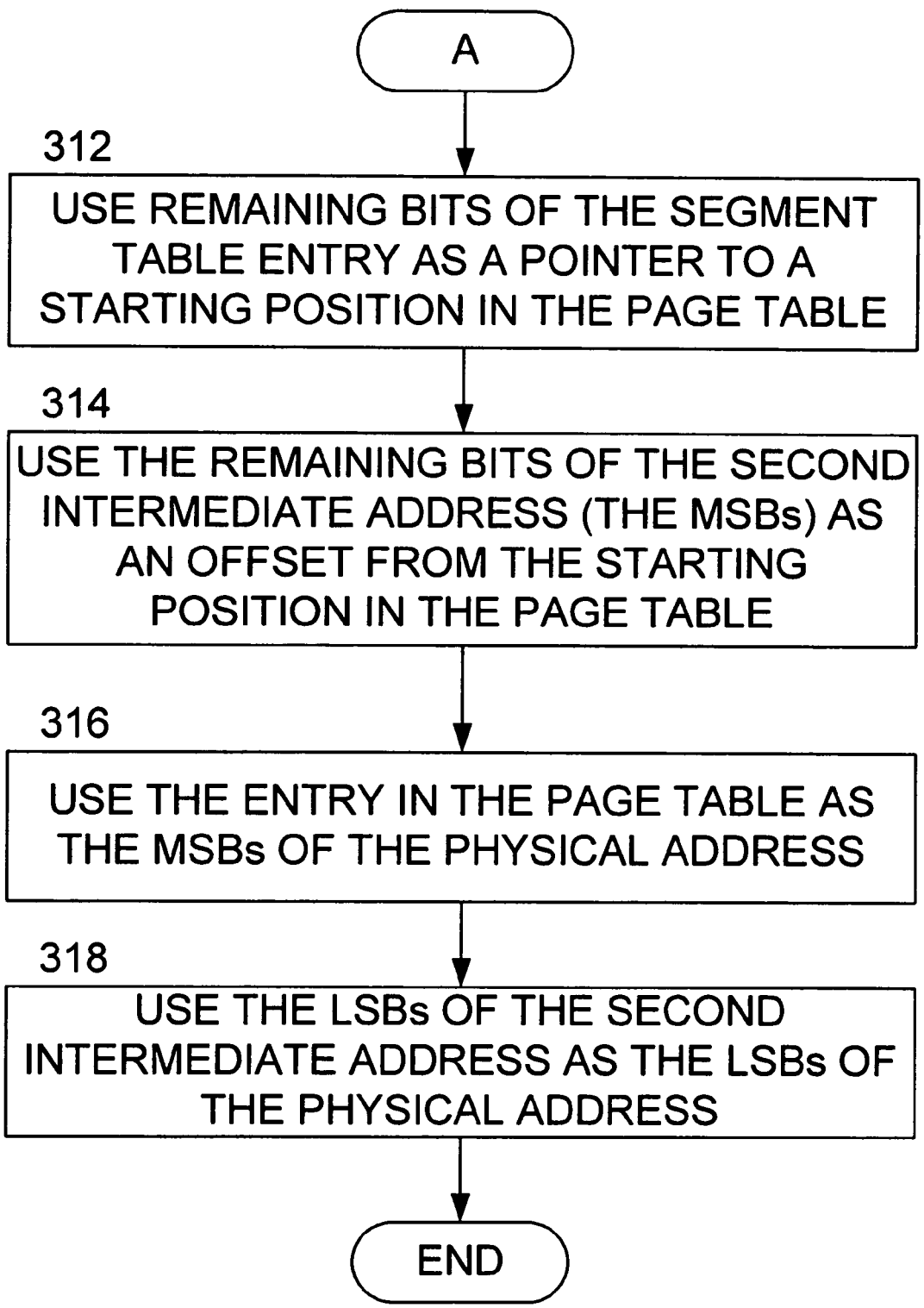
FIG. 6 is a flow diagram illustrating further process steps that may be carried out by the processing system of FIG. 1 in accordance with one or more aspects of the present invention.

With reference to FIGS. 4-6, a more detailed discussion of the operation of the address translator circuit 112 will now be provided. FIG. 4 is a partial block diagram and partial flow diagram illustrating various combinations of functions that the address translator circuit 112 is preferably operable to perform. FIGS. 5-6 are flow diagrams that illustrate process steps that may be carried out by the system 100 to achieve address translation. At action 300, the page size of each segment in the memory 110 may be specified, for example, by the external system 104. This may be achieved via a system call from the external system 104 to the processor 108. Although the page size may be specified, it is preferred that the page size be uniform from page-to-page and from segment-to-segment.

At action 302, the processor 108 preferably initializes the segment table 206 and the page table 208. This involves entering values for each of the entries in the segment table 206 and the page table 208 that comport with the specified page size, the extent and number of segments, etc.

At action 304, the processing system 102 may receive an external address (or virtual address) from the external system 104. Again, this address may be associated with a request to read data from or write data to the memory 110 of the processing system 102. The address translator circuit 112 preferably receives the external address 202 and adds a base address (or offset) thereto to produce a first intermediate address 204 (action 304). Next, the address translator circuit 112 preferably utilizes a first portion 204A of the first intermediate address 204 as a pointer to select one of the plurality of entries of the segment table 206. Preferably, the address translator circuit 112 utilizes the most significant bits (MSBs) 204A of the first intermediate address 204 as the pointer into the segment table 206. Thus, in a general sense, a first portion of the external address 202 is used to select one of the entries of the segment table 206.

The remaining bits 204B of the first intermediate address 204 are preferably utilized by the address translation circuit 112 to produce a second intermediate address 210 (action 308). It is noted that each entry in the segment table 206 preferably includes a number of bits 206A representing the page size within each segment of the memory 110. As illustrated, these bits are preferably the most significant bits of each entry in the segment table 206. The MSBs 206A of the selected entry of the segment table 206 are preferably utilized to divide the bits of the second intermediate address 210. In particular, the MSBs 206A of the selected entry are preferably used to identify a number of least significant bits (LSBs) 210B of the second intermediate address 210. By implication, this also defines the most significant bits 210A of the second intermediate address 210. As will be discussed in more detail herein below, the LSBs 210B of the second intermediate address 210 may be utilized to define a page offset of the physical address 212 (action 310).

Next, at least a portion of the selected entry of the segment table 206 is preferably utilized by the address translator circuit 112 to reference one or more of a plurality of entries 208B of the page table 208. Preferably, the remaining bits (i.e. the least significant bits) 206B of the selected entry of the segment table 206 are utilized to point to a starting position, or top entry, of a group of entries 208A representing a page in the selected segment of the memory 110 (action 312). Next, the address translator circuit 112 preferably utilizes at least a portion of the second intermediate address 210 as a pointer to one of the referenced entries 208A in the page table 208. As the second intermediate address 210 is produced by a portion 204B of the first intermediate address 204, the address translator circuit 112 may be considered to use at least some of the portion 204B of the first intermediate address 204 as a pointer to one of the referenced entries in the page table 208. More particularly, however, the MSBs 210A of the second intermediate address 210 are preferably utilized as an offset from the top entry of the group within the page table 208 to select the one entry 208B of the referenced entries in the page table 208 (action 314).

Next, the address translator circuit 112 is preferably operable to use the portion of the physical address within the selected entry 208B in the page table 208 to produce a portion of the physical address 212 for the translated external address. More particularly, the portion of the physical address within the selected entry 208B of the page table 208 preferably represents the most significant bits (MSBs) 212A of the physical address 212 (action 316). Next, the address translator circuit 112 is preferably operable to use the least significant bits 210B of the second intermediate address 210 to augment the portion of the physical address 212A to produce the physical address 212. Thus, the least significant bits 210B of the second intermediate address 210 are used as the least significant bits 212B of the physical 212 (action 318). At this point, the processing system 102 may utilize the physical address 212 to carry out the read and/or write operation of the memory 110.

Advantageously, the dual table approach of the present invention provides for flexibility in the page size and for ease of aligning segment sizes. Thus, proper alignment of the segments increases the probability of hitting data in the internal memory space 110.

Figure 7:
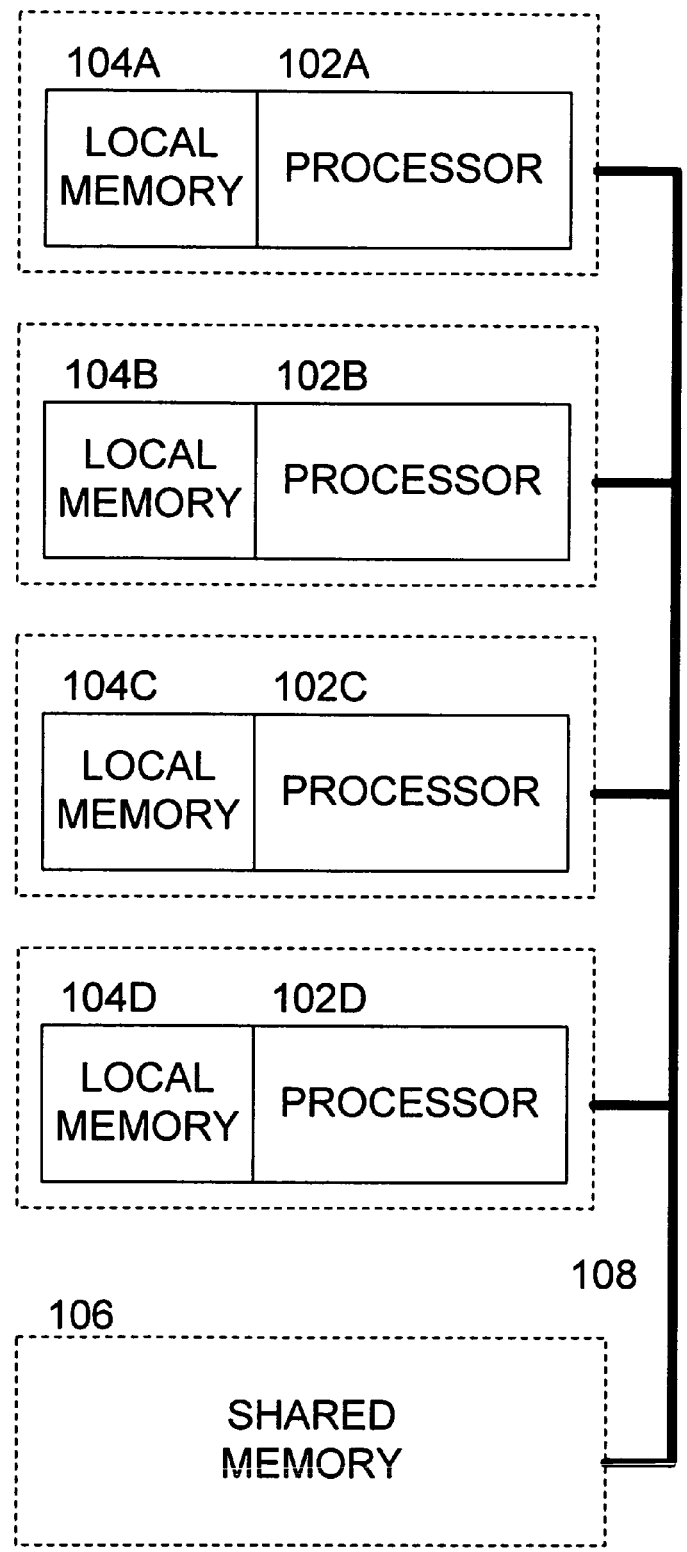
FIG. 7 is a diagram illustrating the structure of a multi-processing system having two or more sub-processors that may be adapted in accordance with one or more aspects of the present invention.

FIG. 7 illustrates a multi-processing system 100A that is adapted to implement one or more further embodiments of the present invention. The system 100A includes a plurality of processors 102A-D, associated local memories 104A-D, and a shared memory 106 interconnected by way of a bus 108. The shared memory 106 may also be referred to herein as a main memory or system memory. Although four processors 102 are illustrated by way of example, any number may be utilized without departing from the spirit and scope of the present invention. Each of the processors 102 may be of similar construction or of differing construction.

Although not shown, the system 100A preferably includes an address translator circuit 112 as discussed hereinabove.

The local memories 104 are preferably located on the same chip (same semiconductor substrate) as their respective processors 102; however, the local memories 104 are preferably not traditional hardware cache memories in that there are no on-chip or off-chip hardware cache circuits, cache registers, cache memory controllers, etc. to implement a hardware cache memory function.

The processors 102 preferably provide data access requests to copy data (which may include program data) from the system memory 106 over the bus 108 into their respective local memories 104 for program execution and data manipulation. The mechanism for facilitating data access is preferably implemented utilizing a direct memory access controller (DMAC), not shown. The DMAC of each processor is preferably of substantially the same capabilities as discussed hereinabove with respect to other features of the invention.

The system memory 106 is preferably a dynamic random access memory (DRAM) coupled to the processors 102 through a high bandwidth memory connection (not shown). Although the system memory 106 is preferably a DRAM, the memory 106 may be implemented using other means, e.g., a static random access memory (SRAM), a magnetic random access memory (MRAM), an optical memory, a holographic memory, etc.

Each processor 102 is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the processors 102 may include an instruction buffer, instruction decode circuitry, dependency check circuitry, instruction issue circuitry, and execution stages.

The DMACs of the processors 120 are preferably operable to facilitate the transfer of a plurality of data blocks between the shared memory 106 and one or more of the local memories 104 in response to a single DMA command issued by one of the processors 102. To this end, the processors 102, local memories 104, DMACs, etc. preferably include substantially the same functionality as discussed above with respect to FIGS. 1-3. For example, each processor may be operable to establish one or more lists 120 within its local memory 104, the DMA command may specify at least one entry, such as entry 122A in the list 120A, and the DMAC may access such entry 122A and begin data block transfers by using the starting address and the size specified in the entry 122A to identify a corresponding data block for transfer.

In one or more embodiments, the processors 102, the local memories 104, and the DMACs 160 may be disposed on a common semiconductor substrate. In one or more further embodiments, the shared memory 106 may also be disposed on the common semiconductor substrate or it may be separately disposed.

In one or more alternative embodiments, one or more of the processors 102 may operate as a main processor operatively coupled to the other processors 102 and capable of being coupled to the shared memory 106 over the bus 108. The main processor may schedule and orchestrate the processing of data by the other processors 102. Unlike the other processors 102, however, the main processor may be coupled to a hardware cache memory, which is operable cache data obtained from at least one of the shared memory 106 and one or more of the local memories 104 of the processors 102. The main processor may provide data access requests to copy data (which may include program data) from the system memory 106 over the bus 108 into the cache memory for program execution and data manipulation utilizing any of the known techniques, such as DMA techniques.

A description of a preferred computer architecture for a multi-processor system will now be provided that is suitable for carrying out one or more of the features discussed herein. In accordance with one or more embodiments, the multi-processor system may be implemented as a single-chip solution operable for stand-alone and/or distributed processing of media-rich applications, such as game systems, home terminals, PC systems, server systems and workstations. In some applications, such as game systems and home terminals, real-time computing may be a necessity. For example, in a real-time, distributed gaming application, one or more of networking image decompression, 3D computer graphics, audio generation, network communications, physical simulation, and artificial intelligence processes have to be executed quickly enough to provide the user with the illusion of a real-time experience. Thus, each processor in the multi-processor system must complete tasks in a short and predictable time.

To this end, and in accordance with this computer architecture, all processors of a multi-processing computer system are constructed from a common computing module (or cell). This common computing module has a consistent structure and preferably employs the same instruction set architecture. The multi-processing computer system can be formed of one or more clients, servers, PCs, mobile computers, game machines, PDAs, set top boxes, appliances, digital televisions and other devices using computer processors.

A plurality of the computer systems may also be members of a network if desired. The consistent modular structure enables efficient, high speed processing of applications and data by the multi-processing computer system, and if a network is employed, the rapid transmission of applications and data over the network. This structure also simplifies the building of members of the network of various sizes and processing power and the preparation of applications for processing by these members.

Figure 8:
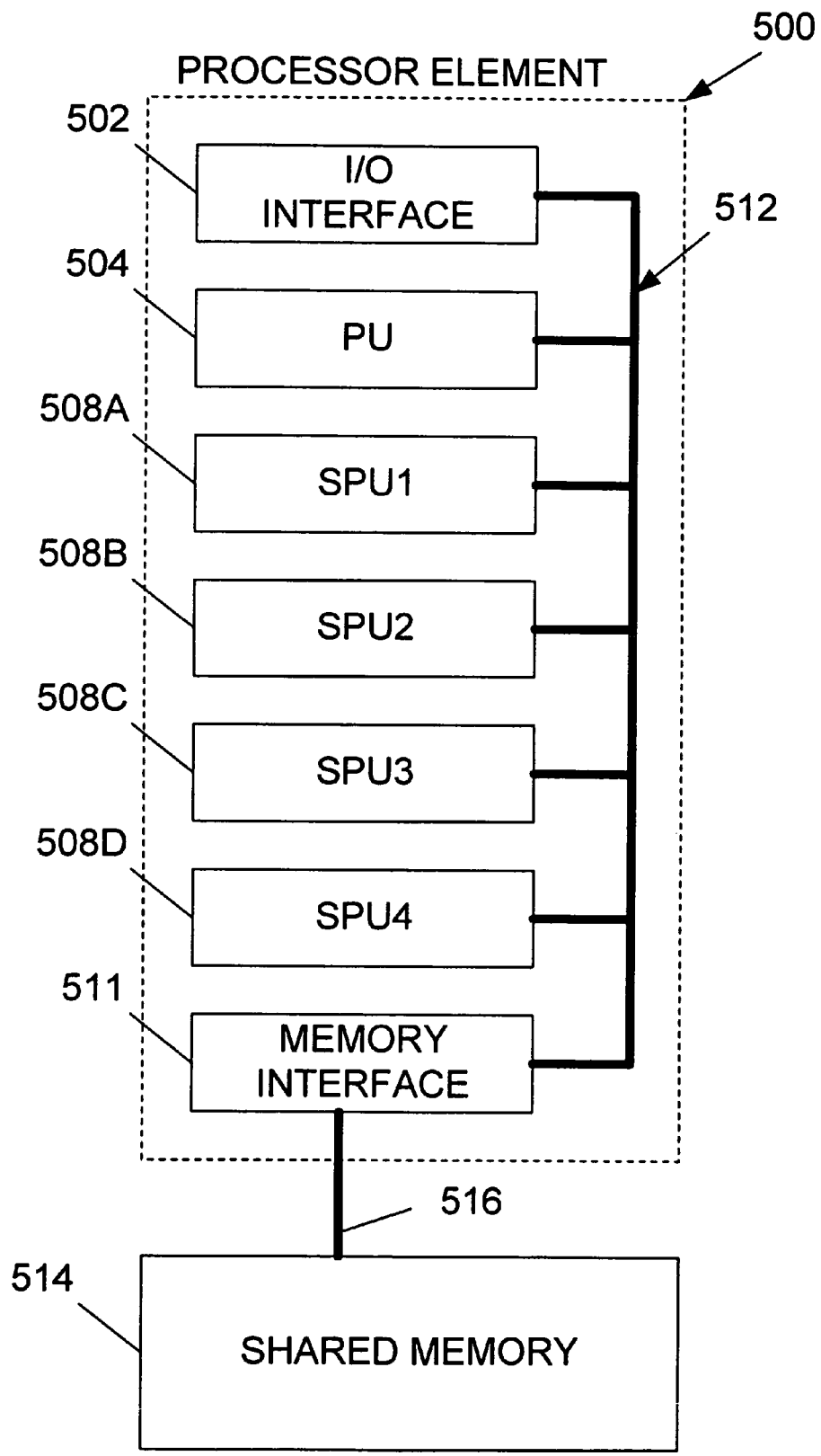
FIG. 8 is a diagram illustrating a preferred processor element (PE) that may be used to implement one or more further aspects of the present invention.

With reference to FIG. 8, the basic processing module is a processor element (PE) 500. The PE 500 comprises an I/O interface 502, a processing unit (PU) 504, and a plurality of sub-processing units 508, namely, sub-processing unit 508A, sub-processing unit 508B, sub-processing unit 508C, and sub-processing unit 508D. A local (or internal) PE bus 512 transmits data and applications among the PU 504, the sub-processing units 508, and a memory interface 511. The local PE bus 512 can have, e.g., a conventional architecture or can be implemented as a packet-switched network. If implemented as a packet switch network, while requiring more hardware, increases the available bandwidth.

The PE 500 can be constructed using various methods for implementing digital logic. The PE 500 preferably is constructed, however, as a single integrated circuit employing a complementary metal oxide semiconductor (CMOS) on a silicon substrate. Alternative materials for substrates include gallium arsinide, gallium aluminum arsinide and other so-called III-B compounds employing a wide variety of dopants. The PE 500 also may be implemented using superconducting material, e.g., rapid single-flux-quantum (RSFQ) logic.

The PE 500 is closely associated with a shared (main) memory 514 through a high bandwidth memory connection 516. Although the memory 514 preferably is a dynamic random access memory (DRAM), the memory 514 could be implemented using other means, e.g., as a static random access memory (SRAM), a magnetic random access memory (MRAM), an optical memory, a holographic memory, etc.

The PU 504 and the sub-processing units 508 are preferably each coupled to a memory flow controller (MFC) including direct memory access DMA functionality, which in combination with the memory interface 511, facilitate the transfer of data between the DRAM 514 and the sub-processing units 508 and the PU 504 of the PE 500. It is noted that the DMAC and/or the memory interface 511 may be integrally or separately disposed with respect to the sub-processing units 508 and the PU 504. Indeed, the DMAC function and/or the memory interface 511 function may be integral with one or more (preferably all) of the sub-processing units 508 and the PU 504. It is also noted that the DRAM 514 may be integrally or separately disposed with respect to the PE 500. For example, the DRAM 514 may be disposed off-chip as is implied by the illustration shown or the DRAM 514 may be disposed on-chip in an integrated fashion.

The PU 504 can be, e.g., a standard processor capable of stand-alone processing of data and applications. In operation, the PU 504 preferably schedules and orchestrates the processing of data and applications by the sub-processing units. The sub-processing units preferably are single instruction, multiple data (SIMD) processors. Under the control of the PU 504, the sub-processing units perform the processing of these data and applications in a parallel and independent manner. The PU 504 is preferably implemented using a PowerPC core, which is a microprocessor architecture that employs reduced instruction-set computing (RISC) technique. RISC performs more complex instructions using combinations of simple instructions. Thus, the timing for the processor may be based on simpler and faster operations, enabling the microprocessor to perform more instructions for a given clock speed.

It is noted that the PU 504 may be implemented by one of the sub-processing units 508 taking on the role of a main processing unit that schedules and orchestrates the processing of data and applications by the sub-processing units 508. Further, there may be more than one PU implemented within the processor element 500.

In accordance with this modular structure, the number of PEs 500 employed by a particular computer system is based upon the processing power required by that system. For example, a server may employ four PEs 500, a workstation may employ two PEs 500 and a PDA may employ one PE 500. The number of sub-processing units of a PE 500 assigned to processing a particular software cell depends upon the complexity and magnitude of the programs and data within the cell.

Figure 9:
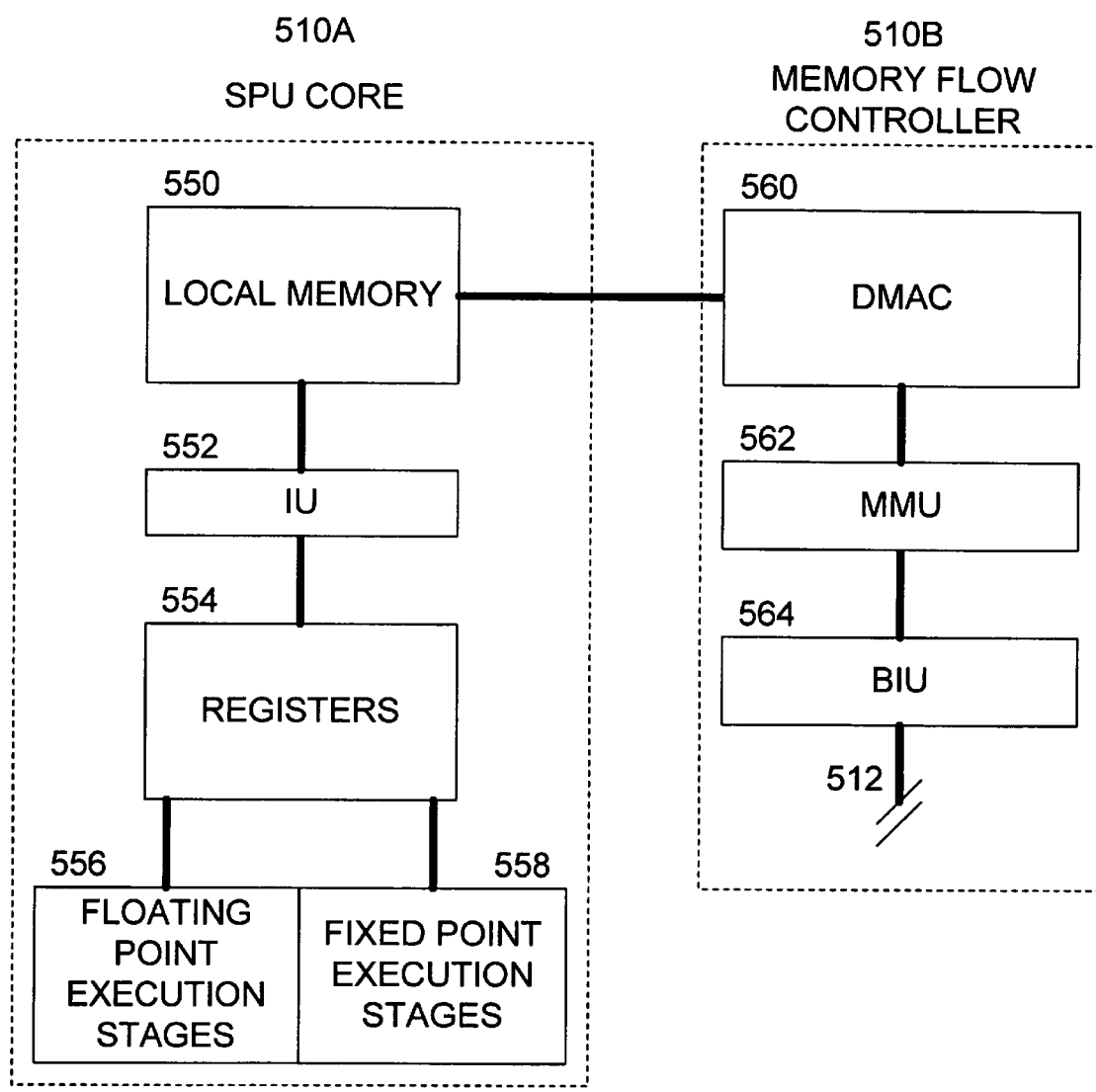
FIG. 9 is a diagram illustrating the structure of an exemplary sub-processing unit (SPU) of the system of FIG. 8 that may be adapted in accordance with one or more further aspects of the present invention.

FIG. 9 illustrates the preferred structure and function of a sub-processing unit (SPU) 508. The SPU 508 architecture preferably fills a void between general-purpose processors (which are designed to achieve high average performance on a broad set of applications) and special-purpose processors (which are designed to achieve high performance on a single application). The SPU 508 is designed to achieve high performance on game applications, media applications, broadband systems, etc., and to provide a high degree of control to programmers of real-time applications. Some capabilities of the SPU 508 include graphics geometry pipelines, surface subdivision, Fast Fourier Transforms, image processing keywords, stream processing, MPEG encoding/decoding, encryption, decryption, device driver extensions, modeling, game physics, content creation, and audio synthesis and processing.

The sub-processing unit 508 includes two basic functional units, namely an SPU core 510A and a memory flow controller (MFC) 510B. The SPU core 510A performs program execution, data manipulation, etc., while the MFC 510B performs functions related to data transfers between the SPU core 510A and the DRAM 514 of the system.

The SPU core 510A includes a local memory 550, an instruction unit (IU) 552, registers 554, one ore more floating point execution stages 556 and one or more fixed point execution stages 558. The local memory 550 is preferably implemented using single-ported random access memory, such as an SRAM. Whereas most processors reduce latency to memory by employing caches, the SPU core 510A implements the relatively small local memory 550 rather than a cache. Indeed, in order to provide consistent and predictable memory access latency for programmers of real-time applications (and other applications as mentioned herein) a cache memory architecture within the SPU 508A is not preferred. The cache hit/miss characteristics of a cache memory results in volatile memory access times, varying from a few cycles to a few hundred cycles. Such volatility undercuts the access timing predictability that is desirable in, for example, real-time application programming. Latency hiding may be achieved in the local memory SRAM 550 by overlapping DMA transfers with data computation. This provides a high degree of control for the programming of real-time applications. As the latency and instruction overhead associated with DMA transfers exceeds that of the latency of servicing a cache miss, the SRAM local memory approach achieves an advantage when the DMA transfer size is sufficiently large and is sufficiently predictable (e.g., a DMA command can be issued before data is needed).

A program running on a given one of the sub-processing units 508 references the associated local memory 550 using a local address, however, each location of the local memory 550 is also assigned a real address (RA) within the overall system's memory map. This allows Privilege Software to map a local memory 550 into the Effective Address (EA) of a process to facilitate DMA transfers between one local memory 550 and another local memory 550. The PU 504 can also directly access the local memory 550 using an effective address. In a preferred embodiment, the local memory 550 contains 556 kilobytes of storage, and the capacity of registers 552 is 128×128 bits.

The SPU core 504A is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the IU 552 includes an instruction buffer, instruction decode circuitry, dependency check circuitry, and instruction issue circuitry.

The instruction buffer preferably includes a plurality of registers that are coupled to the local memory 550 and operable to temporarily store instructions as they are fetched. The instruction buffer preferably operates such that all the instructions leave the registers as a group, i.e., substantially simultaneously. Although the instruction buffer may be of any size, it is preferred that it is of a size not larger than about two or three registers.

In general, the decode circuitry breaks down the instructions and generates logical micro-operations that perform the function of the corresponding instruction. For example, the logical micro-operations may specify arithmetic and logical operations, load and store operations to the local memory 550, register source operands and/or immediate data operands. The decode circuitry may also indicate which resources the instruction uses, such as target register addresses, structural resources, function units and/or busses. The decode circuitry may also supply information indicating the instruction pipeline stages in which the resources are required. The instruction decode circuitry is preferably operable to substantially simultaneously decode a number of instructions equal to the number of registers of the instruction buffer.

The dependency check circuitry includes digital logic that performs testing to determine whether the operands of given instruction are dependent on the operands of other instructions in the pipeline. If so, then the given instruction should not be executed until such other operands are updated (e.g., by permitting the other instructions to complete execution). It is preferred that the dependency check circuitry determines dependencies of multiple instructions dispatched from the decoder circuitry 112 simultaneously.

The instruction issue circuitry is operable to issue the instructions to the floating point execution stages 556 and/or the fixed point execution stages 558.

The registers 554 are preferably implemented as a relatively large unified register file, such as a 128-entry register file. This allows for deeply pipelined high-frequency implementations without requiring register renaming to avoid register starvation. Renaming hardware typically consumes a significant fraction of the area and power in a processing system. Consequently, advantageous operation may be achieved when latencies are covered by software loop unrolling or other interleaving techniques.

Preferably, the SPU core 510A is of a superscalar architecture, such that more than one instruction is issued per clock cycle. The SPU core 510A preferably operates as a superscalar to a degree corresponding to the number of simultaneous instruction dispatches from the instruction buffer, such as between 2 and 3 (meaning that two or three instructions are issued each clock cycle). Depending upon the required processing power, a greater or lesser number of floating point execution stages 556 and fixed point execution stages 558 may be employed. In a preferred embodiment, the floating point execution stages 556 operate at a speed of 32 billion floating point operations per second (32 GFLOPS), and the fixed point execution stages 558 operate at a speed of 32 billion operations per second (32 GOPS).

The MFC 510B preferably includes a bus interface unit (BIU) 564, a memory management unit (MMU) 562, and a direct memory access controller (DMAC) 560. With the exception of the DMAC 560, the MFC 510B preferably runs at half frequency (half speed) as compared with the SPU core 510A and the bus 512 to meet low power dissipation design objectives. The MFC 510B is operable to handle data and instructions coming into the SPU 508 from the bus 512, provides address translation for the DMAC, and snoop-operations for data coherency. The BIU 564 provides an interface between the bus 512 and the MMU 562 and DMAC 560. Thus, the SPU 508 (including the SPU core 510A and the MFC 510B) and the DMAC 560 are connected physically and/or logically to the bus 512.

The MMU 562 is preferably operable to translate effective addresses (taken from DMA commands) into real addresses for memory access. For example, the MMU 562 may translate the higher order bits of the effective address into real address bits. The lower-order address bits, however, are preferably untranslatable and are considered both logical and physical for use to form the real address and request access to memory. In one or more embodiments, the MMU 562 may be implemented based on a 64-bit memory management model, and may provide $2^{64}$ bytes of effective address space with 4K-, 64K-, 1M-, and 16M-byte page sizes and 256MB segment sizes. Preferably, the MMU 562 is operable to support up to $2^{65}$ bytes of virtual memory, and $2^{42}$ bytes (4 TeraBytes) of physical memory for DMA commands. The hardware of the MMU 562 may include an 8-entry, fully associative SLB, a 256-entry, 4 way set associative TLB, and a 4×4 Replacement Management Table (RMT) for the TLB—used for hardware TLB miss handling.

The DMAC 560 is preferably operable to manage DMA commands from the SPU core 510A and one or more other devices such as the PU 504 and/or the other SPUs. There may be three categories of DMA commands: Put commands, which operate to move data from the local memory 550 to the shared memory 514; Get commands, which operate to move data into the local memory 550 from the shared memory 514; and Storage Control commands, which include SLI commands and synchronization commands. The synchronization commands may include atomic commands, send signal commands, and dedicated barrier commands. In response to DMA commands, the MMU 562 translates the effective address into a real address and the real address is forwarded to the BIU 564.

The SPU core 510A preferably uses a channel interface and data interface to communicate (send DMA commands, status, etc.) with an interface within the DMAC 560. The SPU core 510A dispatches DMA commands through the channel interface to a DMA queue in the DMAC 560. Once a DMA command is in the DMA queue, it is handled by issue and completion logic within the DMAC 560. When all bus transactions for a DMA command are finished, a completion signal is sent back to the SPU core 510A over the channel interface.

Figure 10:
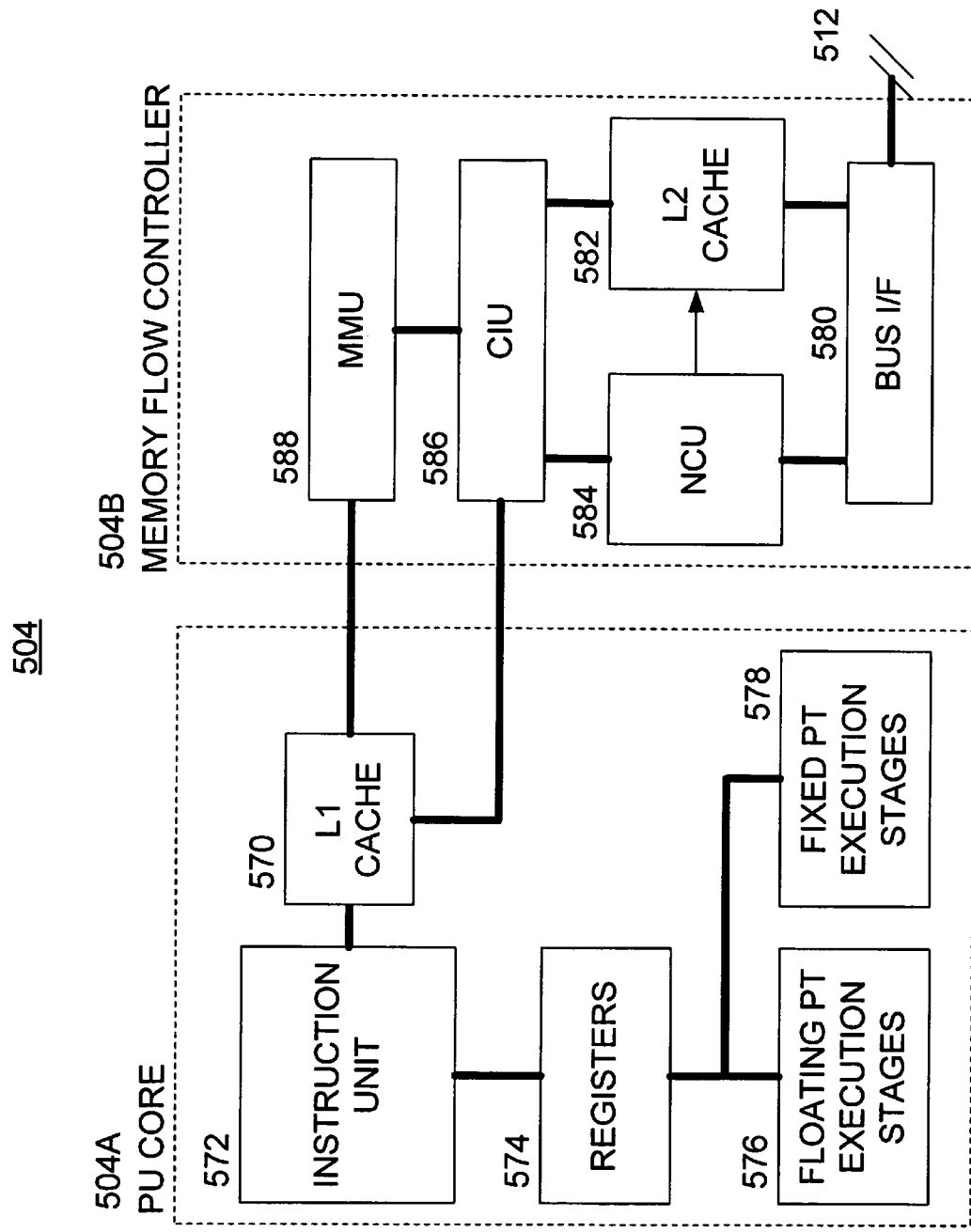
FIG. 10 is a diagram illustrating the structure of an exemplary processing unit (PU) of the system of FIG. 8 that may be adapted in accordance with one or more further aspects of the present invention.

FIG. 10 illustrates the preferred structure and function of the PU 504. The PU 504 includes two basic functional units, the PU core 504A and the memory flow controller (MFC) 504B. The PU core 504A performs program execution, data manipulation, multi-processor management functions, etc., while the MFC 504B performs functions related to data transfers between the PU core 504A and the memory space of the system 100.

The PU core 504A may include an L1 cache 570, an instruction unit 572, registers 574, one or more floating point execution stages 576 and one or more fixed point execution stages 578. The L1 cache provides data caching functionality for data received from the shared memory 106, the processors 102, or other portions of the memory space through the MFC 504B. As the PU core 504A is preferably implemented as a superpipeline, the instruction unit 572 is preferably implemented as an instruction pipeline with many stages, including fetching, decoding, dependency checking, issuing, etc. The PU core 504A is also preferably of a superscalar configuration, whereby more than one instruction is issued from the instruction unit 572 per clock cycle. To achieve a high processing power, the floating point execution stages 576 and the fixed point execution stages 578 include a plurality of stages in a pipeline configuration. Depending upon the required processing power, a greater or lesser number of floating point execution stages 576 and fixed point execution stages 578 may be employed.

The MFC 504B includes a bus interface unit (BIU) 580, an L2 cache memory, a non-cachable unit (NCU) 584, a core interface unit (CIU) 586, and a memory management unit (MMU) 588. Most of the MFC 504B runs at half frequency (half speed) as compared with the PU core 504A and the bus 108 to meet low power dissipation design objectives.

The BIU 580 provides an interface between the bus 108 and the L2 cache 582 and NCU 584 logic blocks. To this end, the BIU 580 may act as a Master as well as a Slave device on the bus 108 in order to perform fully coherent memory operations. As a Master device it may source load/store requests to the bus 108 for service on behalf of the L2 cache 582 and the NCU 584. The BIU 580 may also implement a flow control mechanism for commands which limits the total number of commands that can be sent to the bus 108. The data operations on the bus 108 may be designed to take eight beats and, therefore, the BIU 580 is preferably designed around 128 byte cache-lines and the coherency and synchronization granularity is 128 KB.

The L2 cache memory 582 (and supporting hardware logic) is preferably designed to cache 512 KB of data. For example, the L2 cache 582 may handle cacheable loads/stores, data pre-fetches, instruction fetches, instruction pre-fetches, cache operations, and barrier operations. The L2 cache 582 is preferably an 8-way set associative system. The L2 cache 582 may include six reload queues matching six (6) castout queues (e.g., six RC machines), and eight (64-byte wide) store queues. The L2 cache 582 may operate to provide a backup copy of some or all of the data in the L1 cache 570. Advantageously, this is useful in restoring state(s) when processing nodes are hot-swapped. This configuration also permits the L1 cache 570 to operate more quickly with fewer ports, and permits faster cache-to-cache transfers (because the requests may stop at the L2 cache 582). This configuration also provides a mechanism for passing cache coherency management to the L2 cache memory 582.

The NCU 584 interfaces with the CIU 586, the L2 cache memory 582, and the BIU 580 and generally functions as a queueing/buffering circuit for non-cacheable operations between the PU core 504A and the memory system. The NCU 584 preferably handles all communications with the PU core 504A that are not handled by the L2 cache 582, such as cache-inhibited load/stores, barrier operations, and cache coherency operations. The NCU 584 is preferably run at half speed to meet the aforementioned power dissipation objectives.

The CIU 586 is disposed on the boundary of the MFC 504B and the PU core 504A and acts as a routing, arbitration, and flow control point for requests coming from the execution stages 576, 578, the instruction unit 572, and the MMU unit 588 and going to the L2 cache 582 and the NCU 584. The PU core 504A and the MMU 588 preferably run at full speed, while the L2 cache 582 and the NCU 584 are operable for a 2:1 speed ratio. Thus, a frequency boundary exists in the CIU 586 and one of its functions is to properly handle the frequency crossing as it forwards requests and reloads data between the two frequency domains.

The CIU 586 is comprised of three functional blocks: a load unit, a store unit, and reload unit. In addition, a data pre-fetch function is performed by the CIU 586 and is preferably a functional part of the load unit. The CIU 586 is preferably operable to: (i) accept load and store requests from the PU core 504A and the MMU 588; (ii) convert the requests from full speed clock frequency to half speed (a 2:1 clock frequency conversion); (iii) route cachable requests to the L2 cache 582, and route non-cachable requests to the NCU 584; (iv) arbitrate fairly between the requests to the L2 cache 582 and the NCU 584; (v) provide flow control over the dispatch to the L2 cache 582 and the NCU 584 so that the requests are received in a target window and overflow is avoided; (vi) accept load return data and route it to the execution stages 576, 578, the instruction unit 572, or the MMU 588; (vii) pass snoop requests to the execution stages 576, 578, the instruction unit 572, or the MMU 588; and (viii) convert load return data and snoop traffic from half speed to full speed.

The MMU 588 preferably provides address translation for the PU core 540A, such as by way of a second level address translation facility. A first level of translation is preferably provided in the PU core 504A by separate instruction and data ERAT (effective to real address translation) arrays that may be much smaller and faster than the MMU 588.

In a preferred embodiment, the PU 504 operates at 4-6 GHz, 10F04, with a 64-bit implementation. The registers are preferably 64 bits long (although one or more special purpose registers may be smaller) and effective addresses are 64 bits long. The instruction unit 570, registers 572 and execution stages 574 and 576 are preferably implemented using PowerPC technology to achieve the (RISC) computing technique.

Additional details regarding the modular structure of this computer system may be found in U.S. Pat. No. 6,526,491, the entire disclosure of which is hereby incorporated by reference.

In accordance with at least one further aspect of the present invention, the methods and apparatus described above may be achieved utilizing suitable hardware, such as that illustrated in the figures. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. Furthermore, although the apparatus illustrated in the figures are shown as being partitioned into certain functional blocks, such blocks may be implemented by way of separate circuitry and/or combined into one or more functional units. Still further, the various aspects of the invention may be implemented by way of software and/or firmware program(s) that may be stored on suitable storage medium or media (such as floppy disk(s), memory chip(s), etc.) for transportability and/or distribution.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method, comprising:
   adding a base address to an external address to produce first intermediate address;
   using only a first portion of the first intermediate address as a pointer to select one of a plurality of entries in a segment table, each entry of the segment table representing a different segment of a memory;
   using at least a portion of the selected entry of the segment table as a reference to one or more of a plurality of entries in a page table, each entry in the page table including at least a portion of a physical address in the memory and belonging to a group of entries representing a page in the selected segment of the memory;
   using a second portion of the first intermediate address as a second intermediate address;
   using a number of bits of the selected entry of the segment table to divide the bits of the second intermediate address, thereby producing a portion of the second intermediate address; and
   using the portion of the second intermediate address as a pointer directly to one of the referenced entries in the page table to obtain an at least partially translated physical address into the memory for the external address.

2. The method of claim 1, wherein the step of using a first portion of the first intermediate address includes using the most significant bits thereof as the pointer into the segment table.

3. The method of claim 1, wherein each entry of the segment table includes a number of bits representing the page size within each segment.

4. The method of claim 3, wherein the number of bits are the most significant bits of the selected entry of the segment table.

5. The method of claim 1, wherein the portion of the second intermediate address is a number of most significant bits thereof.

6. The method of claim 5, wherein the number of bits of the selected entry of the segment table are the most significant bits thereof.

7. The method of claim 1, further comprising using the number of bits of the selected entry of the segment table to identify a number of least significant bits of the second intermediate address.

8. The method of claim 7, further comprising using the most significant bits of the second intermediate address as the pointer to select one of the referenced entries in the page table.

9. The method of claim 8, further comprising using the portion of the physical address within the selected entry in the page table to produce a portion of the translated physical address for the external address.

10. The method of claim 9, further comprising using the least significant bits of the second intermediate address to augment the portion of the physical address within the selected entry in the page table to produce the translated physical address for the external address.

11. The method of claim 10, wherein the least significant bits of the second intermediate address are the least significant bits of the translated physical address.

12. The method of claim 1, wherein the portion of the selected entry of the segment table points to a top entry of a group of entries representing a page in the selected segment of the memory.

13. The method of claim 12, further comprising using the most significant bits of the second intermediate address as an offset from the top entry of the group to select the one of the referenced entries in the page table.

14. A method, comprising:
   adding a base address to an external address to produce first intermediate address;
   using only a first portion of the first intermediate address as a pointer to select one of a plurality of entries in a segment table, each entry of the segment table representing a different segment of a memory;
   using at least a portion of the selected entry of the segment table as a reference to one or more of a plurality of entries in a page table, each entry in the page table including at least a portion of a physical address in the memory and belonging to a group of entries representing a page in the selected segment of the memory;
   using least significant bits of the first intermediate address as a second intermediate address;
   using a number of bits of the selected entry of the segment table to divide the bits of the second intermediate address, thereby producing a portion of the second intermediate address containing most significant bits thereof;
   using the portion of the second intermediate address as an offset pointer from the top entry of the group to directly select one of the referenced entries in the page table to obtain an at least partially translated physical address into the memory for the external address; and
   accessing data stored in the memory using the physical address.

15. An apparatus, comprising:
   an adding circuit operating to add a base address to an external address to produce first intermediate address; and
   a look-up circuit operating to: (i) use only a first portion of the first intermediate address as a pointer to select one of a plurality of entries in a segment table, each entry of the segment table representing a different segment of a memory, and (ii) use at least a portion of the selected entry of the segment table as a reference to one or more of a plurality of entries in a page table, each entry in the page table including at least a portion of a physical address in the memory and belonging to a group of entries representing a page in the selected segment of the memory, (iii) use a second portion of the first intermediate address as a second intermediate address, (iv) use a number of bits of the selected entry of the segment table to divide the bits of the second intermediate address, thereby producing a portion of the second intermediate address, and (v) use the portion of the second intermediate address as a pointer directly to one of the referenced entries in the page table to obtain an at least partially translated physical address into the memory for the external address.

16. An apparatus, comprising:
   means for adding a base address to an external address to produce first intermediate address;
   means for using a only first portion of the first intermediate address as a pointer to select one of a plurality of entries in a segment table, each entry of the segment table representing a different segment of a memory;
   means for using at least a portion of the selected entry of the segment table as a reference to one or more of a plurality of entries in a page table, each entry in the page table including at least a portion of a physical address in the memory and belonging to a group of entries representing a page in the selected segment of the memory;

means for using least significant bits of the first intermediate address as a second intermediate address;

means for using a number of bits of the selected entry of the segment table to divide the bits of the second intermediate address, thereby producing a portion of the second intermediate address containing most significant bits thereof; and means for using the portion of the second intermediate address as an offset pointer from the top entry of the group to directly select one of the referenced entries in the page table to obtain an at least partially translated physical address into the memory for the external address.

17. An apparatus, comprising:

at least one processor coupled to a memory; and an address translation circuit operating to translate a virtual address received from an external device into a physical address into the memory, wherein the at least one processor operates to produce a segment table and a page table usable by the address translation circuit, the segment table including a plurality of entries, each representing a different segment of the memory, and the page table including a plurality of entries, each having at least a portion of a physical address in the memory and belonging to a group of entries representing a page in one of the segments of the memory, and the address translation circuit operates to: (i) add a base address to the virtual address to produce first intermediate address; (ii) use only the most significant bits of the first intermediate address as a pointer to select one of a plurality of entries in the segment table; (iii) use at least a portion of the selected entry of the segment table as a pointer directly to a top entry of a group of entries representing a page in the selected segment of the memory; (iv) use least significant bits of the first intermediate address as a second intermediate address; (v) use a number of bits of the selected entry of the segment table to divide the bits of the second intermediate address, thereby producing a portion of the second intermediate address containing most significant bits thereof; and (vi) use the portion of the second intermediate address as an offset pointer from the top entry of the group to select one of the referenced entries in the page table.

18. The method of claim 17, wherein the address translation circuit operates to use the portion of the physical address within the selected entry in the page table to produce a portion of the physical address.

19. The method of claim 18, wherein the address translation circuit operates to use the least significant bits of the second intermediate address to augment the portion of the physical address within the selected entry in the page table to produce the physical address.

20. A computer readable storage medium containing a computer program that causes a processing system to perform actions, comprising:

adding a base address to an external address to produce first intermediate address;

using only a first portion of the first intermediate address as a pointer to select one of a plurality of entries in a segment table, each entry of the segment table representing a different segment of a memory;

using at least the least significant bits of the selected entry of the segment table as a pointer to a selected entry in a page table, each entry in the page table including at least a portion of a physical address in the memory and belonging to a group of entries representing a page in the selected segment of the memory, and the selected entry being of a group of entries representing a page in the selected segment of the memory;

using a second portion of the first intermediate address as a second intermediate address;

using a number of bits of the selected entry of the segment table to divide the bits of the second intermediate address, thereby producing a portion of the second intermediate address containing most significant bits thereof; and using the portion of the second intermediate address as an offset pointer from the top entry of the group to directly select one of the referenced entries in the page table to obtain an at least partially translated physical address into the memory for the external address.

21. The storage medium of claim 20, wherein the step of using a first portion of the first intermediate address includes using the most significant bits thereof as the pointer into the segment table.

22. The storage medium of claim 20, further comprising using the portion of the physical address within the selected entry in the page table as the most significant bits of the physical address.

23. The storage medium of claim 22, further comprising using the least significant bits of the second intermediate address as the least significant bits of the physical address.

24. A method, comprising:

adding a base address to an external address to produce first intermediate address;

using only a first portion of the first intermediate address as a pointer to select one of a plurality of entries in a segment table, each entry of the segment table representing a different segment of a memory;

using at least a portion of the selected entry of the segment table as a reference to one or more of a plurality of entries in a page table, each entry in the page table including at least a portion of a physical address in the memory and belonging to a group of entries representing a page in the selected segment of the memory;

using a second portion of the first intermediate address as a second intermediate address;

using a number of bits of the selected entry of the segment table to identify a number of least significant bits of the second intermediate address; and using a number of most significant bits of the second intermediate address as a pointer directly to one of the referenced entries in the page table to obtain an at least partially translated physical address into the memory for the external address.

* * * * *